United States Patent
Kamon et al.

(10) Patent No.: US 11,305,414 B2
(45) Date of Patent: Apr. 19, 2022

(54) MANIPULATING DEVICE

(71) Applicant: KAWASAKI JUKOGYO KABUSHIKI KAISHA, Kobe (JP)

(72) Inventors: Masayuki Kamon, Akashi (JP); Kenji Kitani, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 21 days.

(21) Appl. No.: 16/766,842

(22) PCT Filed: Nov. 21, 2018

(86) PCT No.: PCT/JP2018/043075
§ 371 (c)(1),
(2) Date: May 26, 2020

(87) PCT Pub. No.: WO2019/103068
PCT Pub. Date: May 31, 2019

(65) Prior Publication Data
US 2020/0298393 A1 Sep. 24, 2020

(30) Foreign Application Priority Data
Nov. 24, 2017 (JP) .............................. JP2017-226265

(51) Int. Cl.
*G05B 15/00* (2006.01)
*G05B 19/00* (2006.01)
(Continued)

(52) U.S. Cl.
CPC ............... *B25J 3/04* (2013.01); *B25J 13/025* (2013.01); *B25J 13/065* (2013.01); *B25J 13/085* (2013.01)

(58) Field of Classification Search
CPC ....... G06F 3/011; G06F 3/012; G05B 19/427; G05B 2219/35448; G05B 2219/40131; G05B 2219/40133; G05B 2219/40134; G05B 2219/40136; G05B 2219/40146; A61B 2090/064; A61B 34/30; A61B 34/37; A61B 34/74; A61B 34/76; A61B 34/77; B25J 3/04; B25J 13/02; B25J 13/025;
(Continued)

(56) References Cited

U.S. PATENT DOCUMENTS 6,016,385 A * 1/2000 Yee ............................ B25J 3/04
700/245
2003/0005786 A1 1/2003 Stuart et al.
(Continued)

FOREIGN PATENT DOCUMENTS

JP 2005-536703 A 12/2005

*Primary Examiner* — Harry Y Oh
(74) *Attorney, Agent, or Firm* — Oliff PLC

(57) ABSTRACT

A manipulating device is provided, which includes a first parallel linkage mechanism having a pair of first links and a pair of second links, a second parallel linkage mechanism having a pair of third links and a pair of fourth links, and a support member supporting one of the third links. The first parallel linkage mechanism and the second parallel linkage mechanism commonly use one of the second links and one of the fourth links and an armrest member to which a manipulating member is attached at a tip-end part thereof is disposed in a lower-end part of the first parallel linkage mechanism.

6 Claims, 10 Drawing Sheets

(51) Int. Cl.
*B25J 3/04* (2006.01)
*B25J 13/02* (2006.01)
*B25J 13/06* (2006.01)
*B25J 13/08* (2006.01)

(58) Field of Classification Search
CPC . B25J 13/04; B25J 13/08; B25J 13/084; B25J 15/0009; B25J 9/1633; B25J 9/1689; B25J 5/005; B25J 17/0266; Y10T 409/307672; Y10T 409/309576; Y10T 74/20207; Y10T 74/20348; B23Q 1/5462
See application file for complete search history.

(56) References Cited

U.S. PATENT DOCUMENTS

| | | | |
|---|---|---|---|
| 2005/0075739 A1* | 4/2005 | Nishizawa | B25J 9/1065 700/65 |
| 2006/0261770 A1* | 11/2006 | Kishi | B25J 9/1676 318/568.11 |
| 2008/0125794 A1* | 5/2008 | Brock | A61B 34/30 606/130 |
| 2012/0328395 A1* | 12/2012 | Jacobsen | B25J 13/025 414/1 |
| 2015/0066051 A1* | 3/2015 | Kwon | B25J 3/04 606/130 |
| 2018/0078319 A1* | 3/2018 | Nobles | A61B 17/00234 |
| 2018/0368931 A1* | 12/2018 | Hongo | G06F 3/01 |
| 2019/0183595 A1* | 6/2019 | Peine | A61B 34/25 |
| 2019/0329422 A1* | 10/2019 | Hongo | B25J 9/1065 |

* cited by examiner

MANIPULATING DEVICE

TECHNICAL FIELD

The present disclosure relates to a manipulating device.

BACKGROUND ART

Parallel manipulators capable of operating 6 degrees of freedom are known (e.g., see Patent Document 1). The parallel manipulator disclosed in Patent Document 1 includes an end platform for supporting an object to be manipulated, and a middle platform which is disposed so as to be separated from the end platform and in coupled to the end platform through a coupling element. A plurality of first links are coupled to the end platform, and a plurality of second links are coupled to the middle platform.

In the parallel manipulator disclosed in Patent Document 1, it is described that a user can grip a handle attached to the end platform and the user operates the end platform like a joystick.

REFERENCE DOCUMENT OF CONVENTIONAL ART

Patent Document

[Patent Document 1] JP2005-536703A

DESCRIPTION OF THE DISCLOSURE

Problem to be Solved by the Disclosure

However, in the parallel manipulator disclosed in Patent Document 1, the handle is simply attached to the end platform, and therefore, it does not take the user's physical burden into consideration at all. Therefore, in the parallel manipulator disclosed in Patent Document 1, the user may put an unnecessary force in his/her hand (wrist, elbow) and/or shoulder, and therefore, the user may easily get tired.

The present disclosure is to solve the conventional problem, and one purpose thereof is to provide a manipulating device capable of reducing burden or load to an operator's hand and/or shoulder, as compared with the conventional manipulating device.

SUMMARY OF THE DISCLOSURE

In order to solve the problem described above, a manipulating device according to the present disclosure includes a first parallel linkage mechanism having a pair of first links and a pair of second links, a second parallel linkage mechanism having a pair of third links and a pair of fourth links, and a support member supporting one of the third links. The first parallel linkage mechanism and the second parallel linkage mechanism commonly use one of the second links and one of the fourth links. An armrest member to which a manipulating member is attached at a tip-end part thereof is disposed in a lower-end part of the first parallel linkage mechanism.

Thus, the operator is able to operate while he/she places the elbow on the armrest member, thus, operator's burden is reduced as compared with the conventional manipulating device.

Further, since one of the third links is supported by the support member, the first parallel linkage mechanism and the second parallel linkage mechanism can be operated while the center of the shoulder joint is substantially in agreement with the center of a rotation shaft of the second parallel linkage mechanism. Thus, the first parallel linkage mechanism and the second parallel linkage mechanism can operate following the motion of the operator so that the burden on the operator is further reduced.

Effect of the Disclosure

According to the manipulating device of the present disclosure, burden or load to an operator's hand and/or shoulder is reduced as compared with the conventional manipulating device.

MODE FOR CARRYING OUT THE DISCLOSURE

Figure 1:
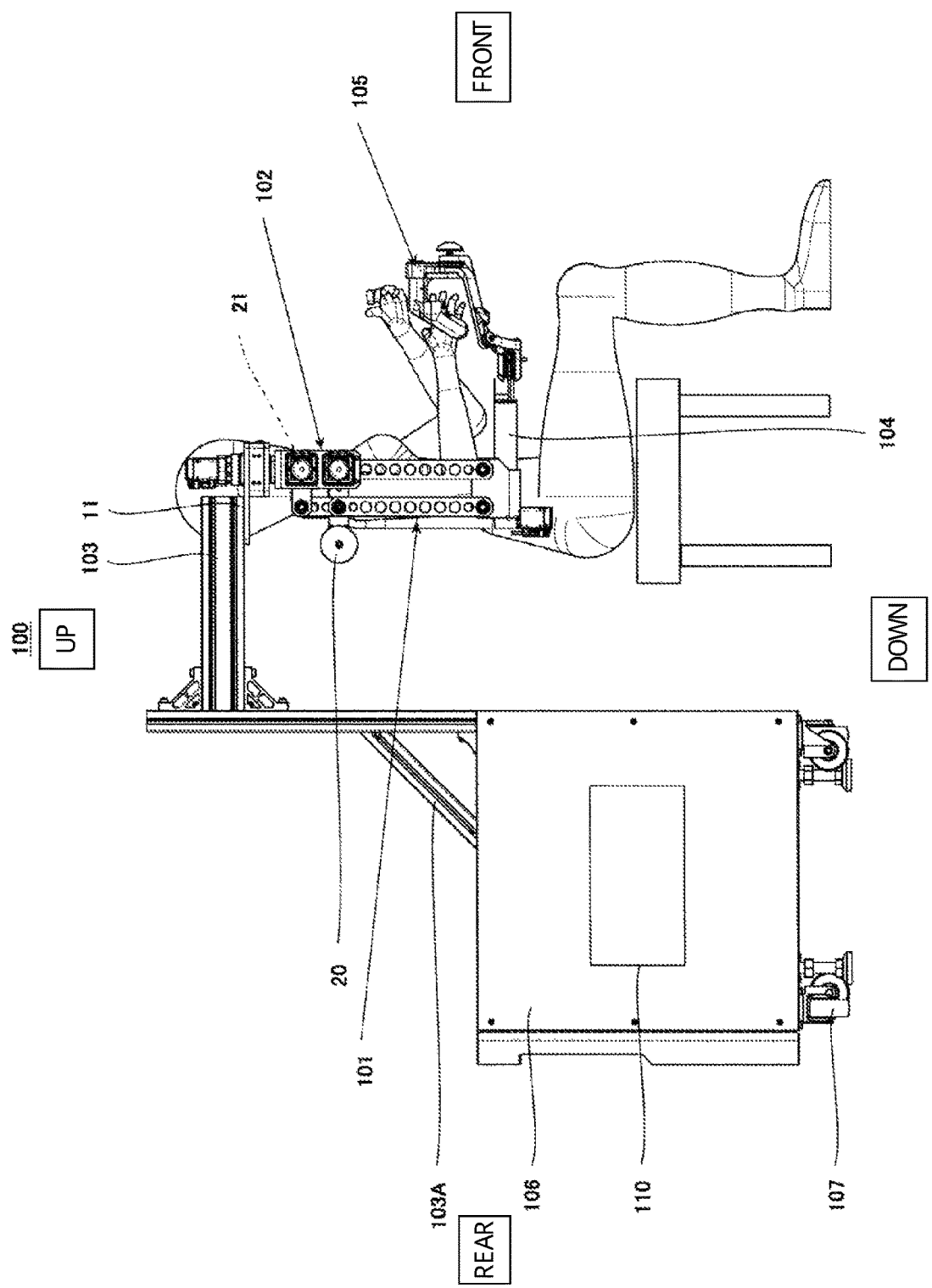
FIG. 1 is a side view illustrating an outline configuration of a manipulating device according to Embodiment 1.

Hereinafter, one embodiment of the present disclosure is described with reference to the drawings. Note that, throughout the drawings, the same reference characters are given to the same or corresponding parts to omit redundant description. Moreover, throughout the drawings, components illustrating the present disclosure are selectively illustrated, and illustration of other components may be omitted. Further, the present disclosure is not limited to the following embodiment.

Embodiment 1

A manipulating device according to Embodiment 1 includes a first parallel linkage mechanism having a pair of first links and a pair of second links, a second parallel linkage mechanism having a pair of third links and a pair of fourth links, and a support member configured to support one of the third links. The first parallel linkage mechanism and the second parallel linkage mechanism are configured to commonly use one of the second links and one of the fourth links. An armrest member to which a manipulating member is attached at a tip-end part thereof is disposed in a lower-end part of the first parallel linkage mechanism.

Moreover, the manipulating device according to Embodiment 1 may further include position sensors which detect respective positions of a base-end part of one of the first links and a base-end part of the other second link, and a controller which controls a position and/or posture of a robot based on the positions detected by the position sensors.

Moreover, in the manipulating device according to Embodiment 1, the position sensor may be disposed outward of the manipulating device.

Moreover, in the manipulating device according to Embodiment 1, the second parallel linkage mechanism may be supported rotatably about a yaw axis.

Moreover, in the manipulating device according to Embodiment 1, the manipulating member may include a grip part, a first movable part configured to rotate the grip part about the yaw axis, a second movable part configured to rotate the grip part about a pitch axis, and a third movable part configured to rotate the grip part about a roll axis. The first movable part may be disposed rearward of the grip part.

Further, in the manipulating device according to Embodiment 1, a drive motor may be disposed in each of a base-end part of the one first link and a base-end part of the other second link. The control device may execute a bilateral control.

Below, one example of the manipulating device according to Embodiment 1 is described with reference to FIGS. 1 to 10.

[Configuration of Manipulating Device]

Figure 2:
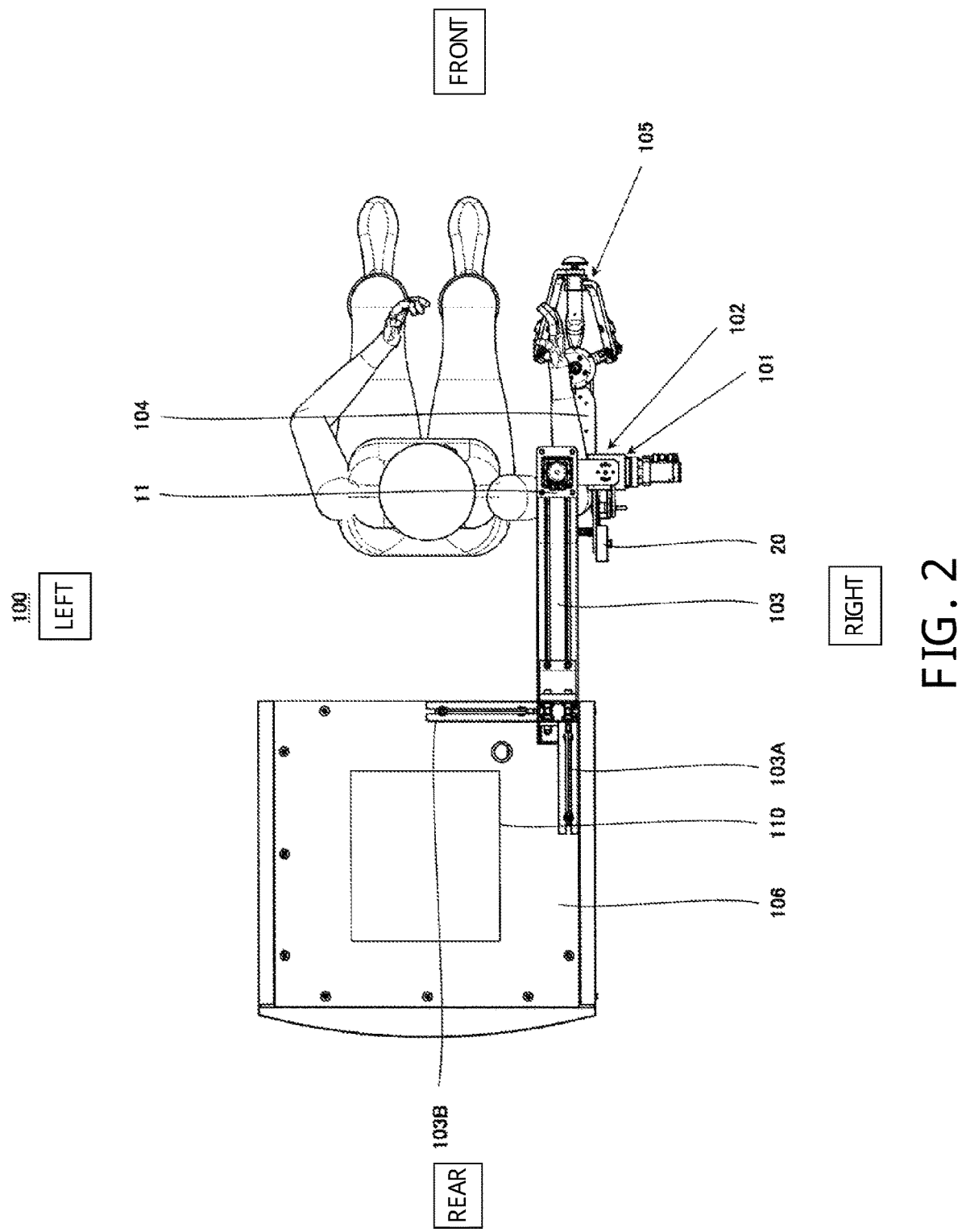
FIG. 2 is a plan view illustrating the outline configuration of the manipulating device according to Embodiment 1.
Figure 3:
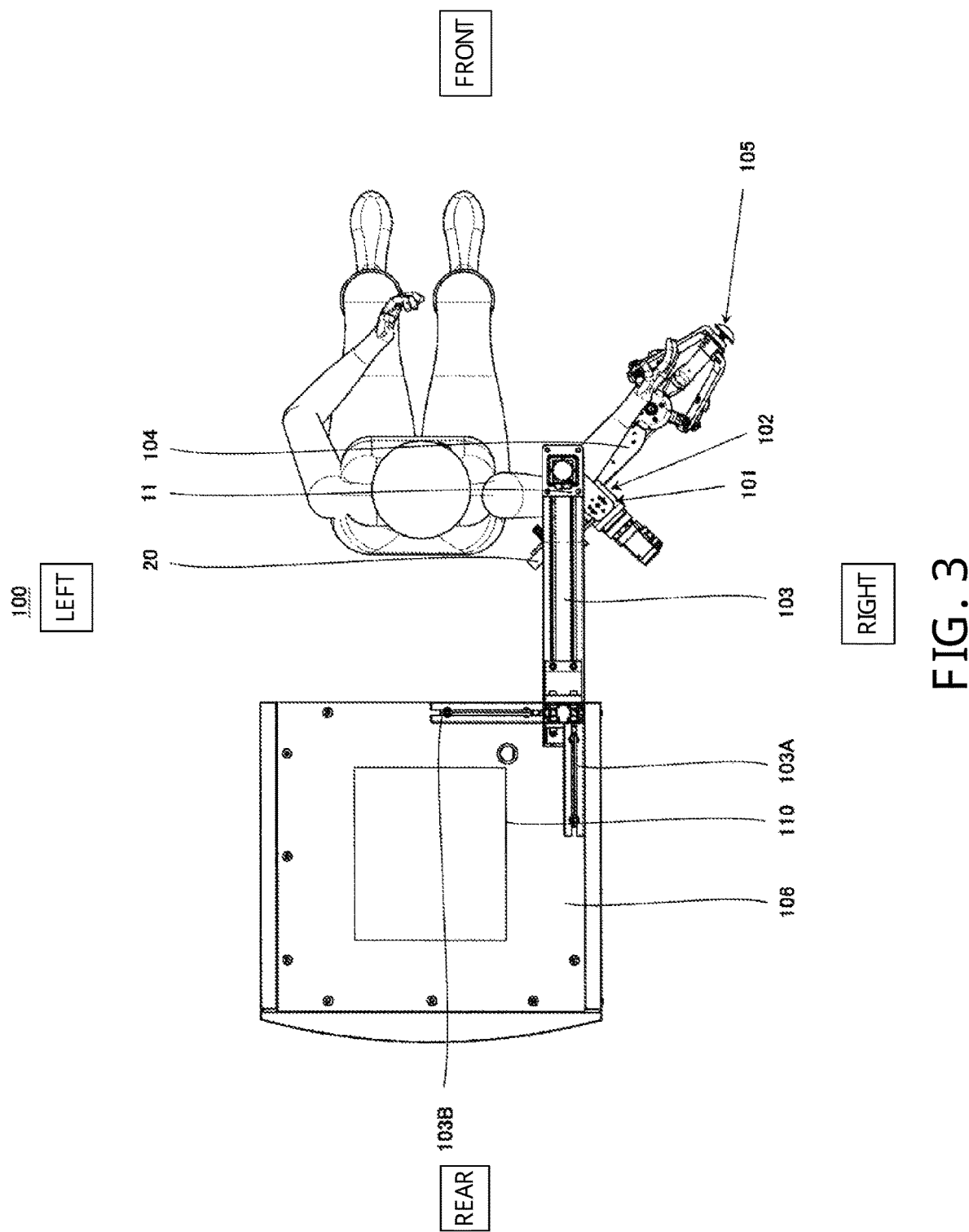
FIG. 3 is a plan view illustrating the outline configuration of the manipulating device according to Embodiment 1.
Figure 4:
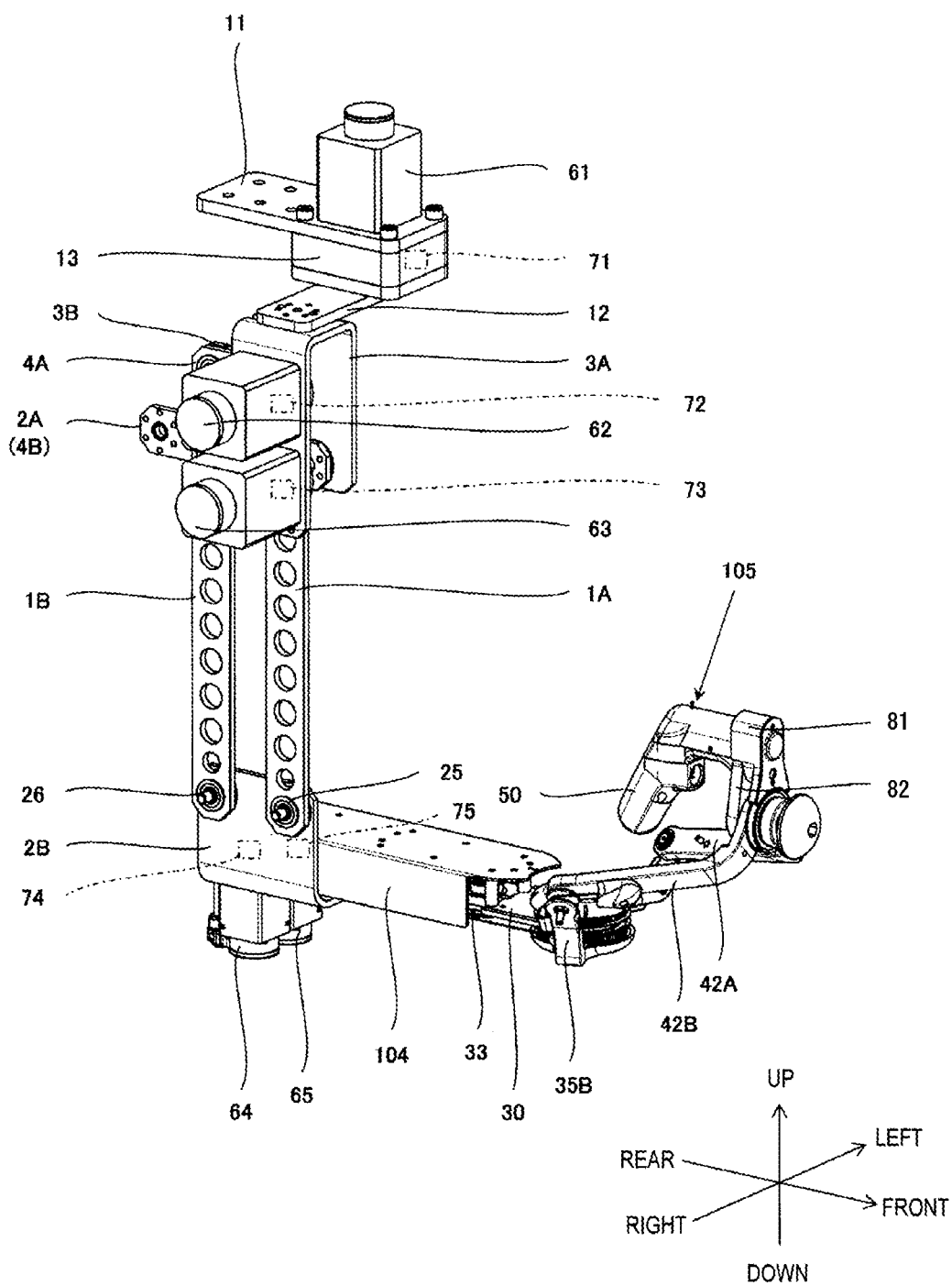
FIG. 4 is a perspective view illustrating an outline configuration of a substantial part of the manipulating device illustrated in FIG. 1.
Figure 5:
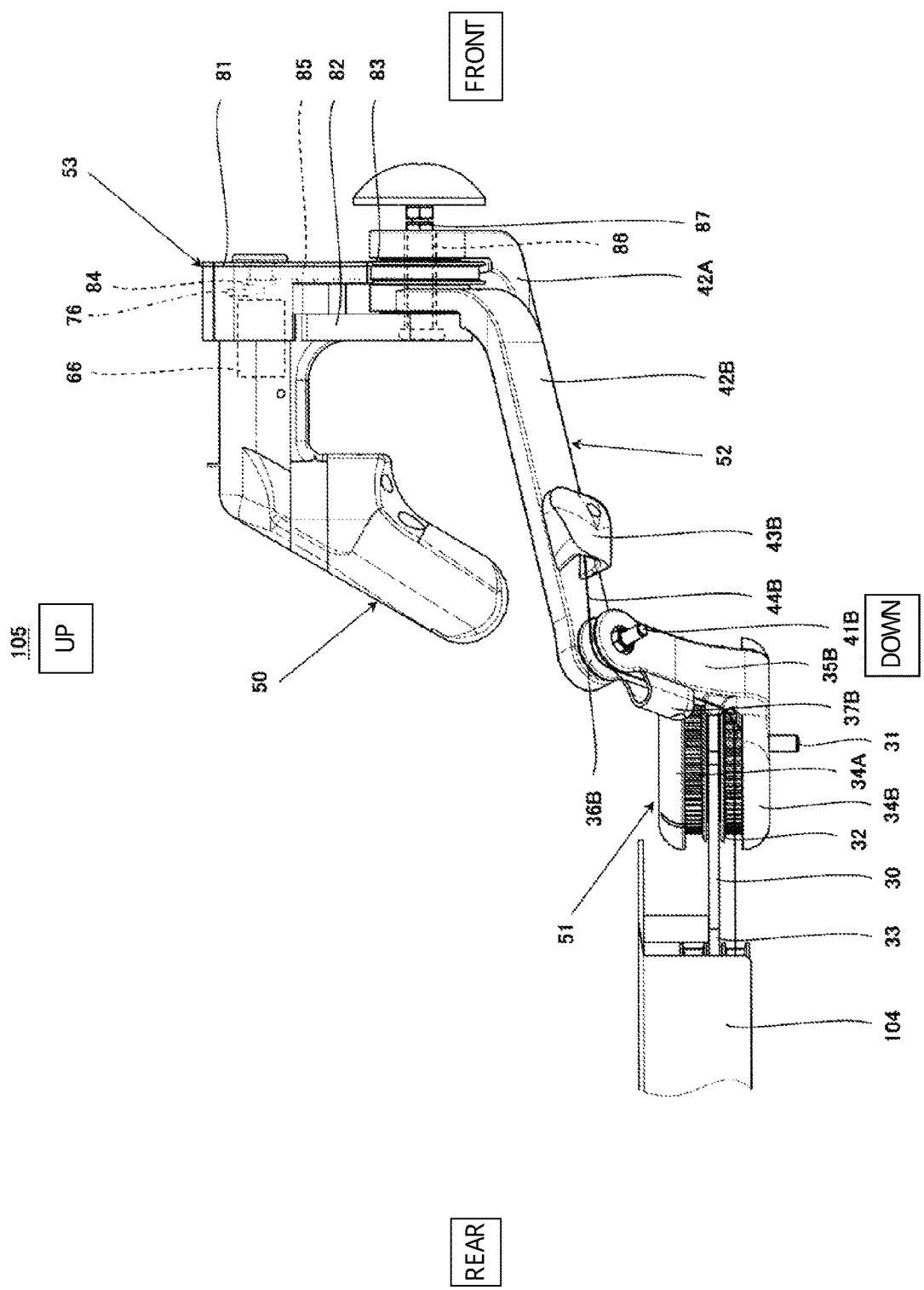
FIG. 5 is a side view illustrating an outline configuration of a manipulating member of the manipulating device illustrated in FIG. 1.
Figure 6:
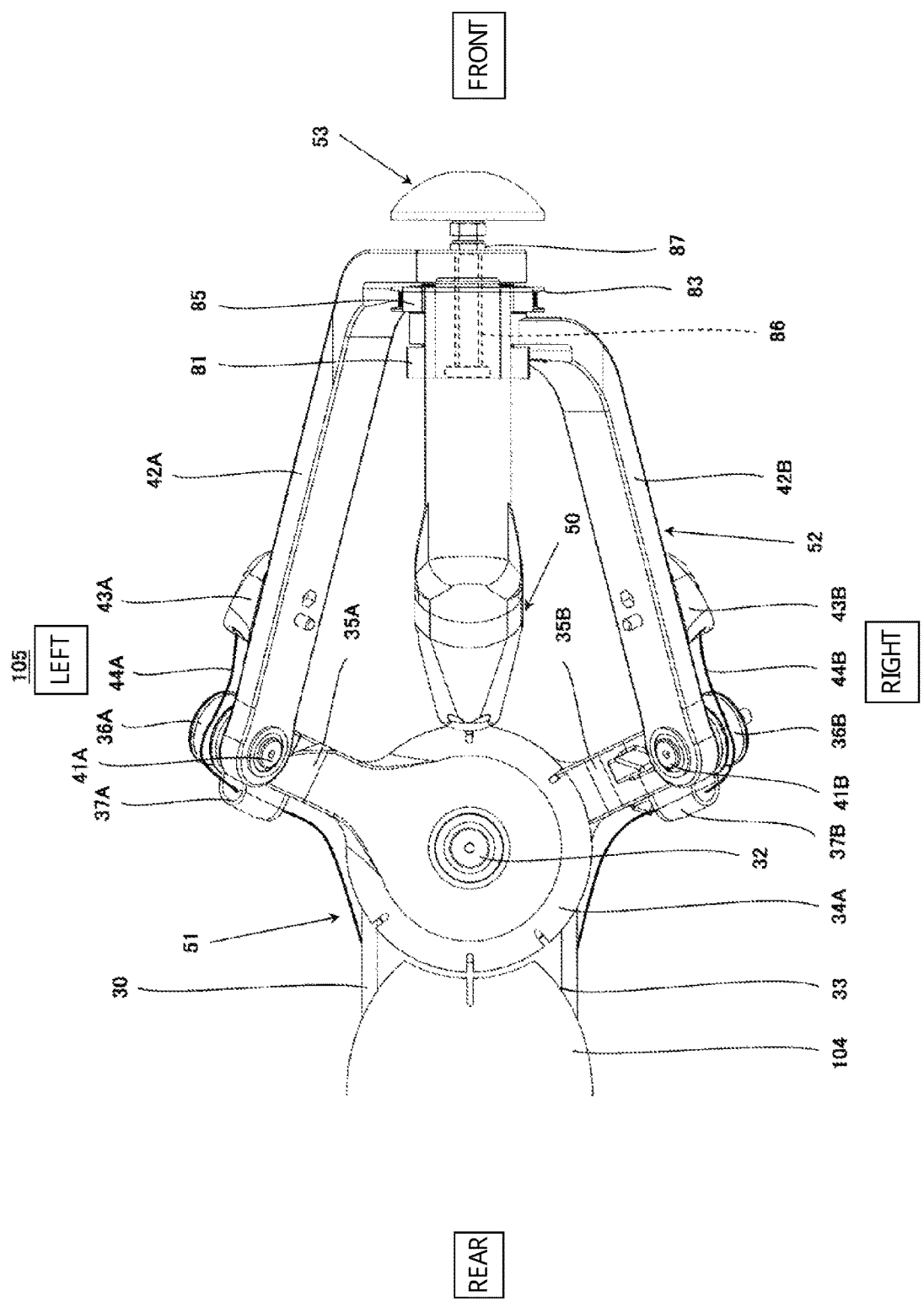
FIG. 6 is a plan view illustrating the outline configuration of the manipulating member of the manipulating device illustrated in FIG. 1.

FIG. 1 is a side view illustrating an outline configuration of the manipulating device according to Embodiment 1. FIGS. 2 and 3 are plan views illustrating the outline configuration of the manipulating device according to Embodiment 1. FIG. 4 is a perspective view illustrating an outline configuration of a substantial part of the manipulating device illustrated in FIG. 1. FIG. 5 is a side view illustrating an outline configuration of the manipulating member of the manipulating device illustrated in FIG. 1. FIG. 6 is a plan view illustrating the outline configuration of the manipulating member of the manipulating device illustrated in FIG. 1.

Note that, in FIGS. 1 to 6, the vertical direction, the front-and-rear direction, and the left-and-right direction in the manipulating device are indicated as the vertical direction, the front-and-rear direction, and the left-and-right direction in these figures. Moreover, in FIGS. 2 and 3, an operator and the manipulating member are offset in order to illustrate the configuration of the manipulating member in the drawings.

As illustrated in FIGS. 1 to 6, a manipulating device 100 according to Embodiment 1 includes a first parallel linkage mechanism 101, a second parallel linkage mechanism 102, and a support member 103 configured to support the second parallel linkage mechanism 102. An armrest member 104 to which a manipulating member 105 is attached at a tip-end part thereof is disposed at a lower-end part of the first parallel linkage mechanism 101.

The manipulating device 100 also includes a carriage 106 and a controller 110, and is configured to control a position and/or a posture of the robot 200 (described later) by the operator operating the manipulating member 105.

Wheels 107 are provided to a lower surface of the carriage 106, and the manipulating device 100 is configured to be movable by the wheels 107. The controller 110 is disposed inside the carriage 106. Moreover, the support member 103 is fixed to an upper surface of the carriage 106.

The support member 103 is formed in a substantially inverted L-shape. Reinforcement members 103A and 103B are provided to an intermediate part of a supporting part of the support member 103 so that the support member 103 is connected to the upper surface of the carriage 106. Moreover, a rear-end part of a strip-shaped first connecting member 11 is fixed to a tip-end part of the support member 103 (see FIG. 4).

A drive motor 61 is provided to a tip-end part of the first connecting member 11 so that the axial center of an output shaft is oriented in the yaw-axis direction. A base-end part of the second connecting member 12 is connected to the output shaft of the drive motor 61 through a reduction gear or gear box 13. Moreover, a position sensor 71 which detects a position of the base-end part of the second connecting member 12 is provided to the second connecting member 12.

The position sensor 71 is configured to detect the position of the base-end part of the second connecting member 12 and output the detected positional information to the controller 110. For example, the position sensor 71 may be a rotation sensor which detects a rotational position of the base-end part of the second connecting member 12. For example, the rotation sensor includes a rotary encoder, a potentiometer, or a laser sensor. Note that the position sensor 71 may detect a rotational position of the output shaft of the drive motor 61, and detect this rotational position as the rotational position of the base-end part of the second connecting member 12.

The second parallel linkage mechanism 102 is provided to a lower surface of the second connecting member 12. The second parallel linkage mechanism 102 includes a pair of third links 3A and 3B, and a pair of fourth links 4A and 4B. The third link 3A is formed in a substantially inverted U-shape, and an upper surface thereof is fixed to the second connecting member 12. Thus, the third link 3A is supported through the first connecting member 11, second connecting member 12, etc., in a state where it is suspended by the support member 103.

A base-end part (front-end part) of the fourth link 4A is rotatably attached to a tip-end part (upper-end part) of the third link 3A through a shaft member (rotation shaft) 21. A position sensor 72 which detects a position of the base-end part of the fourth link 4A is provided to the base-end part of the fourth link 4A. Moreover, a drive motor 62 is connected with the shaft member 21 through a reduction gear or gear box (not illustrated).

The position sensor 72 is disposed outward of the manipulating device 100 (here, right side), and it is configured to detect the position of the base-end part of the fourth link 4A and output the detected positional information to the controller 110. For example, the position sensor 72 may be a rotation sensor which detects a rotational position of the base-end part of the fourth link 4A. For example, the rotation sensor includes a rotary encoder, a potentiometer, or a laser sensor. Note that the position sensor 72 may detect the rotational position of the output shaft of the drive motor 62, and detect this rotational position as the rotational position of the base-end part of the fourth link 4A.

Figure 8:
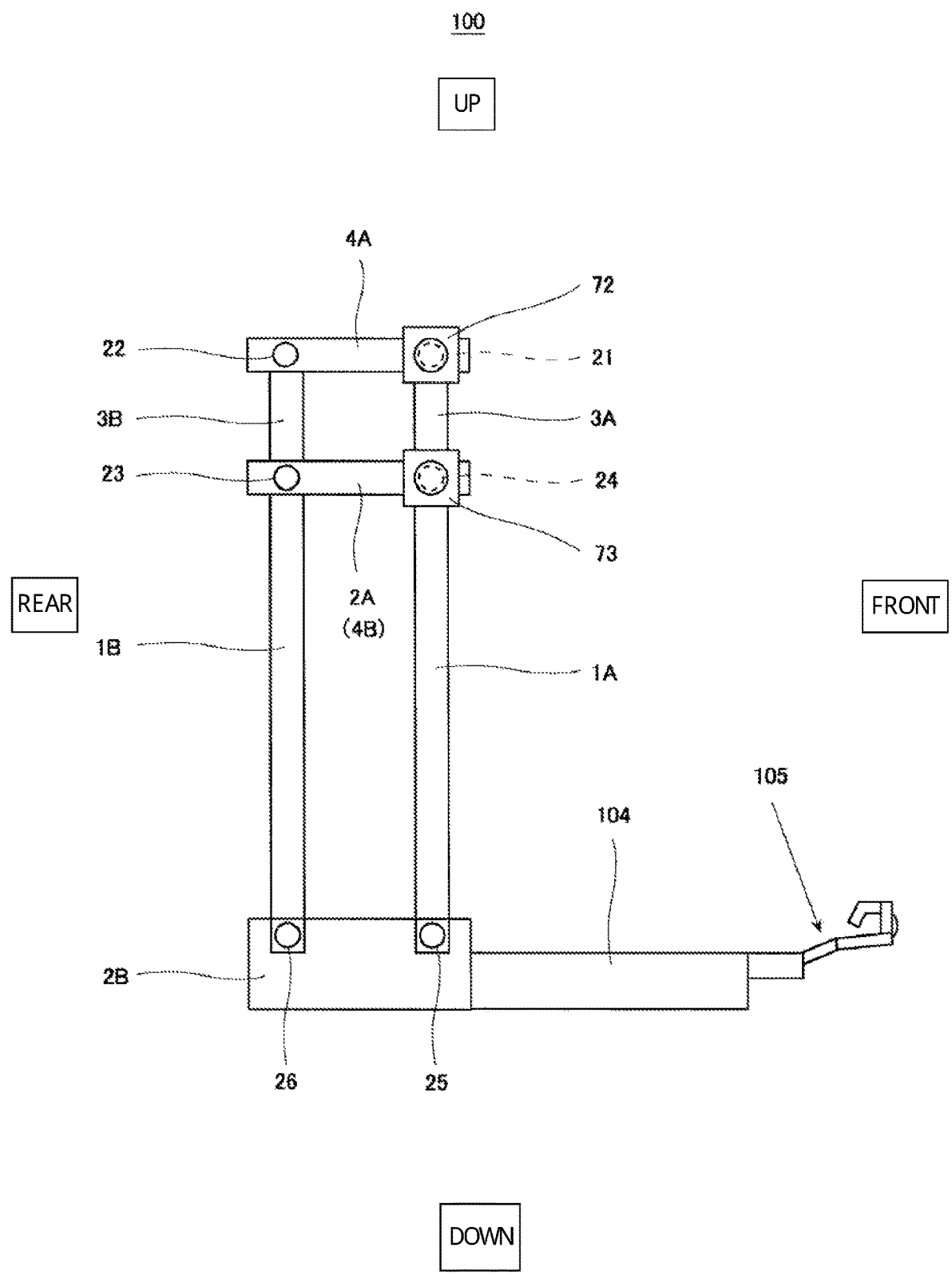
FIG. 8 is a schematic diagram illustrating an outline configuration of a substantial part of the manipulating device illustrated in FIG. 1.

A tip-end part (upper-end part) of the third link 3B is rotatably attached to a tip-end part (rear-end part) of the fourth link 4A through a shaft member 22 (see FIG. 8). A tip-end part (rear-end part) of the fourth link 4B is rotatably attached to the base-end part (lower-end part) of the third link 3B through a shaft member 23 (see FIG. 8). Moreover, a counter weight 20 is provided to a tip end of the fourth link 4B. A base-end part (lower-end part) of the third link 3A is rotatably attached to the base-end part (front-end part) of the fourth link 4B through a shaft member 24 (see FIG. 8).

The first parallel linkage mechanism 101 is provided below the second parallel linkage mechanism 102. The first parallel linkage mechanism 101 includes a pair of first links 1A and 1B, and a pair of second links 2A and 2B.

A base-end part (front-end part) of the second link 2A is rotatably attached to the base-end part (upper-end part) of the first link 1A through the shaft member 24 (see FIG. 8). A base-end part (upper-end part) of the first link 1B is rotatably attached to the tip-end part (rear-end part) of the second link 2A through the shaft member 23 (see FIG. 8). Here, as illustrated in FIG. 4, a strip-shaped plate member which constitutes the second link 2A constitutes the fourth link 4B. That is, in Embodiment 1, the first parallel linkage mechanism 101 and the second parallel linkage mechanism 102 are configured so that the second link 2A and the fourth link 4B are common.

Therefore, a base-end part of the second link 2A (the fourth link 4B) and a base-end part of the third link 3A are rotatably attached to the base-end part of the first link 1A through the shaft member 24. Moreover, a tip-end part of the second link 2A (the fourth link 4B) and a base-end part of the third link 3B are rotatably attached to the base-end part of the first link 1B through the shaft member 23.

Moreover, a position sensor 73 which detects a position of the base-end part of the first link 1A is provided to the base-end part of the first link 1A. Moreover, a drive motor 63 is connected with the shaft member 24 through a reduction gear or gear box (not illustrated).

The position sensor 73 is disposed outward of the manipulating device 100, and it is configured to detect the position of the base-end part of the first link 1A and output the detected positional information to the controller 110. For example, the position sensor 73 may be a rotation sensor which detects a rotational position of the base-end part of the first link 1A. For example, the rotation sensor includes a rotary encoder, a potentiometer, or a laser sensor. Note that the position sensor 73 may detect a rotational position of the output shaft of the drive motor 63 and detect this rotational position as a rotational position of the base-end part of the first link 1A.

Further, a base-end part (front-end part) of the substantially L-shaped second link 2B is rotatably attached to the tip-end part (lower-end part) of the first link 1A through a shaft member 25. A tip-end part (lower-end part) of the first link 1B is rotatably attached to the tip-end part (rear-end part) of the second link 2B through a shaft member 26.

The cylindrical armrest member 104 (here, rectangular cylindrical) is fixed to the second link 2B. For example, an upper surface of the armrest member 104 may be formed in flat surface or may be curved in an arc shape so that an operator is able to place his/her elbow thereon. Moreover, drive motors 64 and 65 for driving the manipulating member 105 are provided to a rear-end part of the armrest member 104.

As illustrated in FIGS. 5 and 6, the manipulating member 105 includes a grip part 50, a first movable part 51, a second movable part 52, and a third movable part 53. The first movable part 51 is disposed rearward of the grip part 50.

The first movable part 51 has a shaft member 31, a pulley 32, a belt 33, a pulley (not illustrated) disposed at the drive motor 64 side, and a pair of disk members 34A and 34B. The first movable part 51 is attached to the armrest member 104 rotatably about the yaw axis, through a plate-shaped connecting member 30.

In detail, a base-end part (rear-end part) of the connecting member 30 is connected to the armrest member 104, and a through-hole (not illustrated) of which the axial center extends in the yaw-axis direction is formed in the tip-end part (front-end part) of the connecting member 30. The shaft member 31 is inserted into the through-hole of the connecting member 30, and the pulley 32 is disposed at the shaft member 31. The belt 33 is wound around the pulley 32 so as to be connected with the pulley (not illustrated) disposed at the drive motor 64 side. Thus, the first movable part 51 can rotate about the yaw axis relatively to the armrest member 104.

Moreover, the pair of disk members 34A and 34B are provided to the pulley 32 so that they sandwich the pulley 32 from above and below. The shaft member 31 is inserted into the disk members 34A and 34B, and therefore, the disk members 34A and 34B can rotate about the yaw axis.

The first link part 35A is provided to a side surface of the disk member 34A so as to extend upwardly. The second link member 42A which constitutes the second movable part 52 is rotatably provided to the tip-end part (upper-end part) of the first link part 35A through the shaft member 41A.

Moreover, the tip-end part of the first link part 35A is formed in an arc shape when seen in the left-and-right direction, and a groove 36A is formed in an upper surface of the tip-end part. A wire 44A is disposed in the groove 36A.

A tip-end part of the wire 44A is fixed to a fixed part 43A provided to a side surface of the second link member 42A. Moreover, the wire 44A is guided downwardly by the groove 36A, is inserted into the guide part 37A provided to a rear surface of the first link part 35A, passes through the side of the pulley 32, and is drawn into the armrest member 104. A base-end part of the wire 44A is connected to the drive motor 65 through a suitable component.

Similarly, a first link part 35B is formed in a side surface of the disk member 34B so as to extend upwardly. A second link member 42B which constitutes the second movable part 52 is rotatably provided to the tip-end part (upper-end part) of the first link part 35B through the shaft member 41B.

Moreover, a tip-end part of the first link part 35B is formed in an arc shape when seen in the left-and-right direction, and a groove 36B is formed in an upper surface of the tip-end part. A wire 44B is disposed in the groove 36B.

A tip-end part of the wire 44B is fixed to a fixed part 43B provided to a side surface of the second link member 42B. Moreover, the wire 44B is guided downwardly by groove 36B, is inserted into a guide part 37B provided to a rear surface of the first link part 35B, passes through the side of the pulley 32, and is drawn into the armrest member 104. A base-end part of the wire 44B is connected to the drive motor 65 by a suitable component.

Note that, in the manipulating device 100 according to Embodiment 1, when pivoting the manipulating member 105 (grip part 50) about the pitch axis, the first link parts 35A and 35B pivot so that the axial centers of the shaft members 41A and 41B become parallel to the pitch axis. Conversely, when not pivoting the manipulating member 105 about the pitch axis, each component of the manipulating member 105 is disposed so that the axial centers of the shaft members 41A and 41B do not become parallel to the pitch axis. Thus, pivoting of the grip part 50 about the pitch axis can be prevented, and therefore, the positional state of the grip part 50 can be easily maintained.

The third movable part 53 is rotatably attached to the tip-end parts (front-end parts) of the second link members 42A and 42B about the roll axis. The third movable part 53 has a case-like body part 81 and a plate-shaped supporting part 82, and the supporting part 82 is formed so as to extend downwardly from a lower surface of the body part 81.

The tip-end part of the second link member 42A, the pulley 83, and the tip-end part of the second link member 42B are disposed forward of the supporting part 82, in this order from forward to rearward. A through-hole is formed in each of the tip-end part of the second link member 42A, the pulley 83, the tip-end part of the second link member 42B, and the base-end part (lower-end part) of the supporting part 82, and a shaft member 86 is inserted into the through-hole.

When the manipulating member 105 (grip part 50) is located at the original point, the shaft member 86 is disposed so that the axial center of the shaft member 86 becomes parallel to the roll axis. A fastening member 87 is provided to a tip-end part of the shaft member 86. The tip-end part of the second link member 42A, the pulley 83, the tip-end part of the second link member 42B, and the supporting part 82 are jointly fastened by the shaft member 86 and the fastening member 87.

The grip part 50 is attached to a rear-end part of the body part 81. Moreover, a drive motor 66 is disposed inside the body part 81. A pulley 84 is connected to an output shaft of the drive motor 66. A belt 85 is wound around the pulley 84 so as to connect with the pulley 83.

Thus, the manipulating member 105 (grip part 50) can pivot about the roll axis relatively to the armrest member 104 through the third movable part 53.

Moreover, the position sensors 74-76 are disposed near the output shafts of the drive motors 64-66, respectively. The position sensor 74 is configured to detect a rotational position of the output shaft of the drive motor 64 and output the detected positional information to the controller 110 as rotational positional information of the first movable part 51. Moreover, the position sensor 75 is configured to detect the rotational position of the output shaft of the drive motor 65 and output the detected positional information to the controller 110 as rotational positional information of the second movable part 52. Further, the position sensor 76 is configured to detect the rotational position of the output shaft of the drive motor 66 and output the detected positional information to the controller 110 as rotational positional information of the third movable part 53.

For example, as the position sensors 74-76, a rotary encoder, a potentiometer, or a laser sensor may be used. Note that, in Embodiment 1, although the position sensors 74-76 detect the rotational positions of the drive motors 64-66 and output the detected positional information to the controller 110 as the respective rotational positional information of the first to third movable parts 51-53, it is not limited to this configuration. The position sensors 74-76 may directly detect the respective rotational positional information of the first to third movable parts 51-53.

The controller 110 includes a processor, such as a microprocessor or a CPU, and a memory, such as a ROM and a RAM (not illustrated). The memory stores information on a basic program, various fixed data, etc. The processor controls various operations of the robot 200 by reading and executing software, such as the basic program stored in the memory.

Moreover, the controller 110 is configured to control the position and/or the posture of the robot 200 based on the positional information inputted from the position sensors 71-76. Alternatively, the controller 110 may be configured to control each of the drive motors 61-66 so that the grip part 50 returns to the original point.

Note that, the controller 110 may be comprised of a sole controller 110 which carries out a centralized control, or may be comprised of a plurality of controllers 110 which collaboratively carry out a distributed control. Moreover, the controller 110 may be comprised of a microcomputer, or may be comprised of a MPU, a PLC (Programmable Logic Controller), a logic circuit, etc.

[Configuration of Robot System]

Next, one example of a robot system provided with the manipulating device according to Embodiment 1 is described with reference to FIG. 7.

Figure 7:
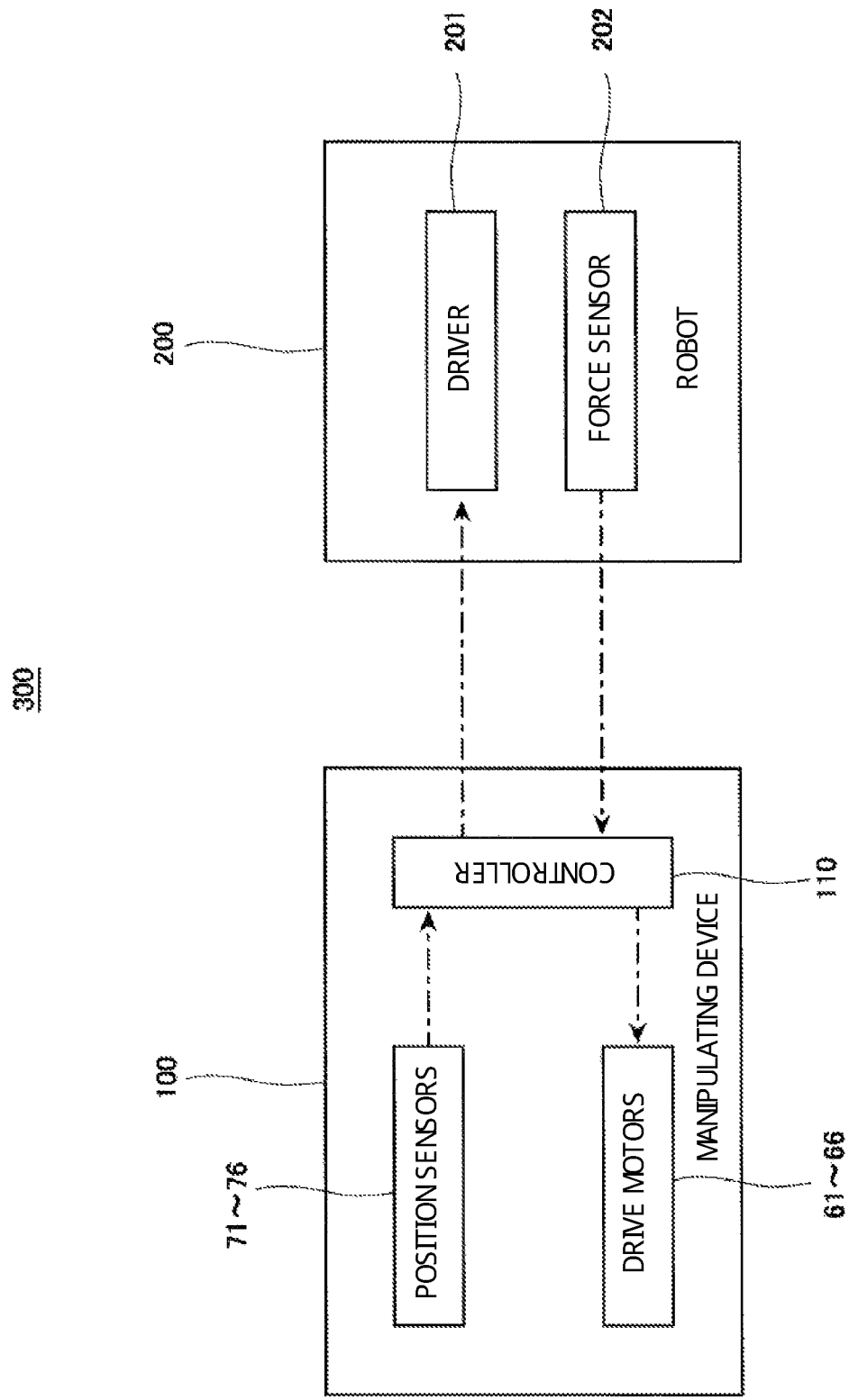
FIG. 7 is a block diagram illustrating an outline configuration of a robot system provided with the manipulating device according to Embodiment 1.

FIG. 7 is a block diagram illustrating an outline configuration of the robot system provided with the manipulating device according to Embodiment 1.

As illustrated in FIG. 7, the robot system 300 provided with the manipulating device according to Embodiment 1 includes the manipulating device 100 and the robot 200. The robot 200 may be a horizontal articulated dual-arm robot, or may be other robots, such as horizontal articulated and vertical articulated types.

The robot 200 has a driver 201 for relatively driving each joint. The driver 201 is configured to actuate based on instruction value(s) of the position and/or the posture of the robot 200 outputted from the controller 110. For example, the driver 201 may be a servo motor.

Moreover, the robot 200 may have a force sensor 202. The force sensor 202 is configured to detect a reaction force acting on an end effector etc. from an external object, or a force acting on an external object by the end effector, and output the detected force information to the controller 110.

Then, the controller 110 may execute a haptics control in which the force information detected by the force sensor 202 is fed back to the drive motors 61-66. Alternatively, the controller 110 may control the manipulating device 100 and the robot 200 bilaterally.

[Operation and Effects of Manipulating Device and Robot System Provided with Manipulating Device]

Next, operation and effects of the manipulating device according to Embodiment 1 are described with reference to FIGS. 1 to 10.

Figure 9:
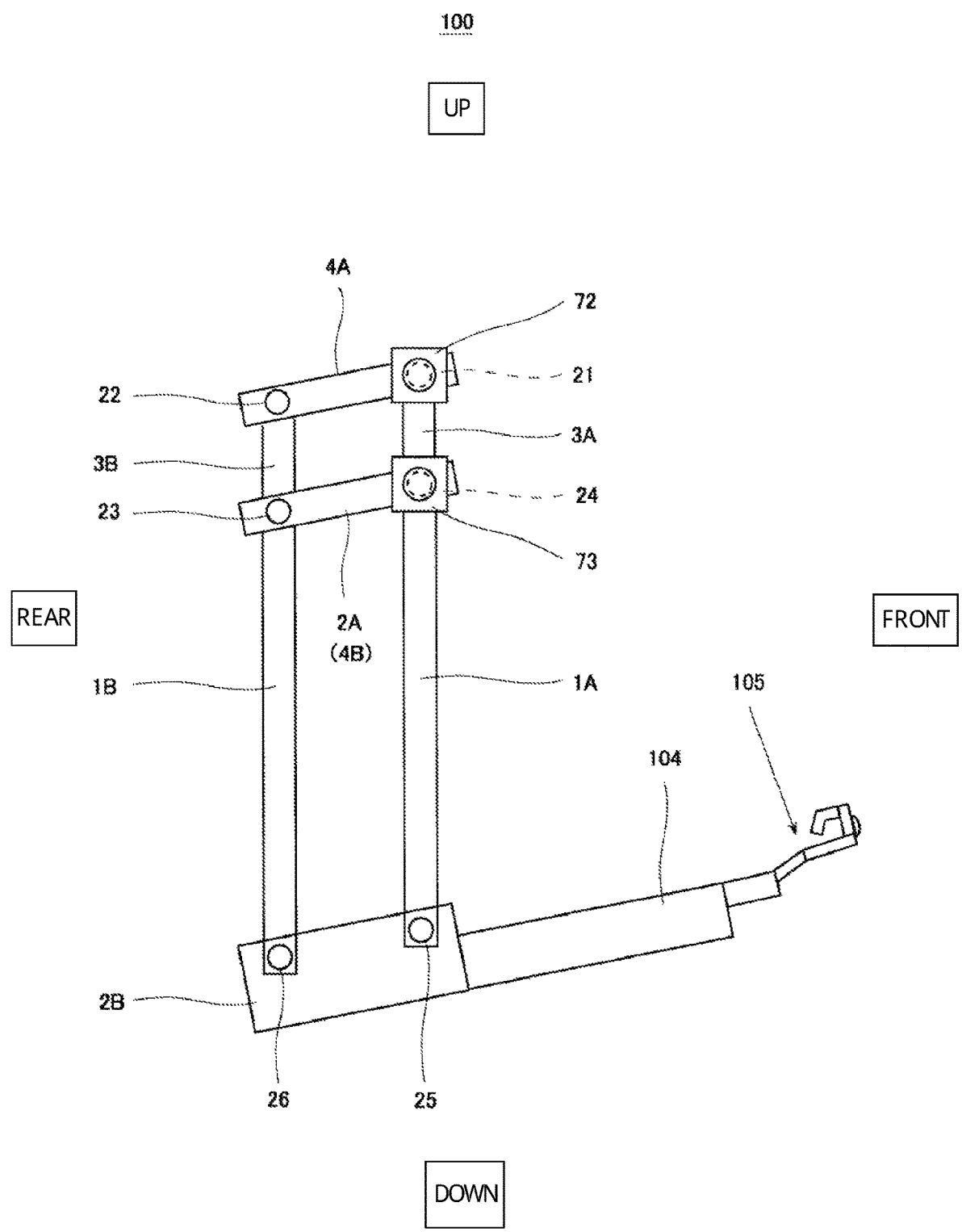
FIG. 9 is a schematic diagram illustrating the outline configuration of the substantial part of the manipulating device illustrated in FIG. 1.
Figure 10:
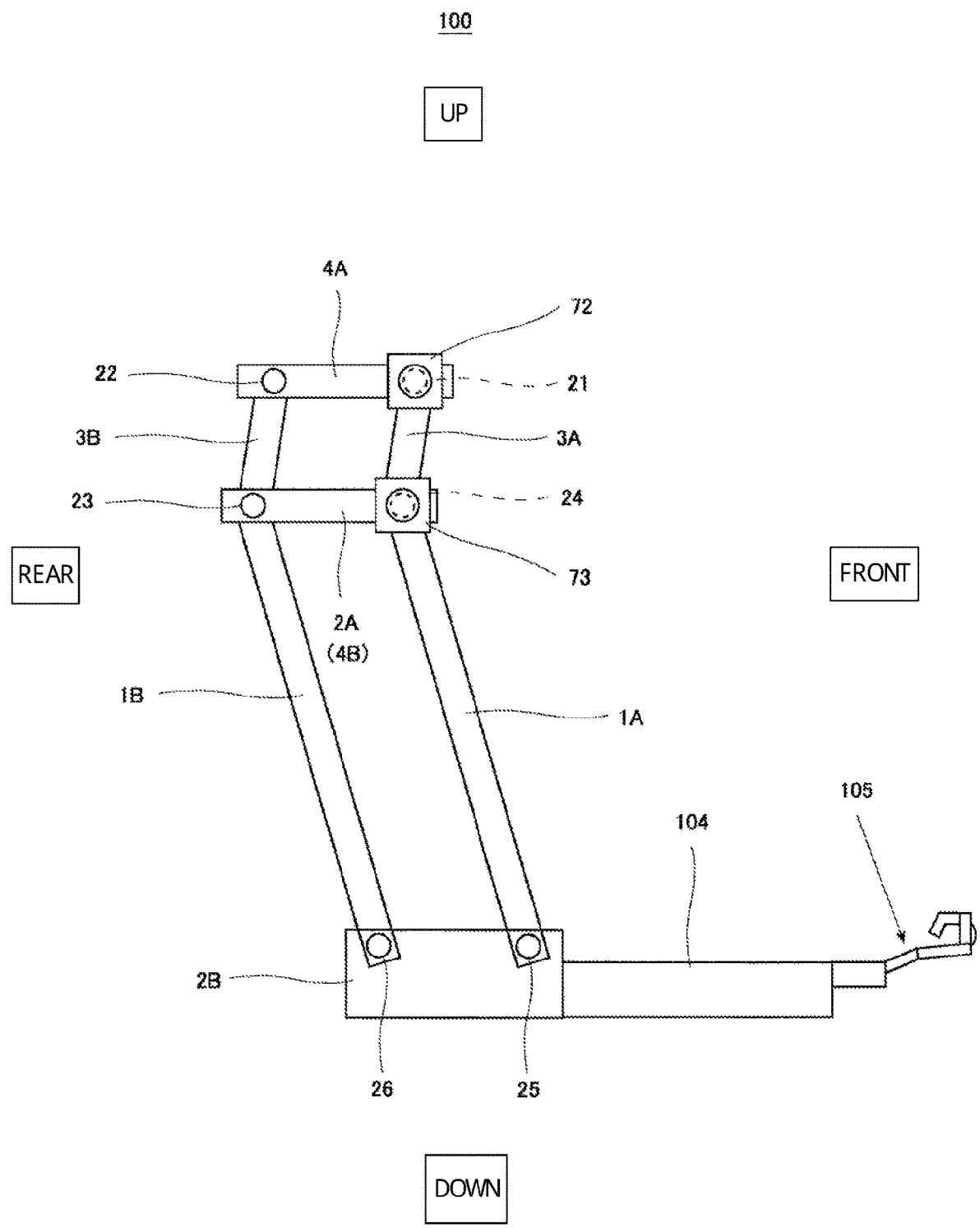
FIG. 10 is a schematic diagram illustrating the outline configuration of the substantial part of the manipulating device illustrated in FIG. 1.

FIGS. 8 to 10 are schematic diagrams illustrating an outline configuration of a substantial part of the manipulating device illustrated in FIG. 1. FIG. 8 illustrates a state where the manipulating member (grip part) is located at the original point. FIG. 9 illustrates a state when the operator pivots the manipulating member (grip part) upward while using his/her elbow as a fulcrum. FIG. 10 illustrates a state when the operator projects the manipulating member (grip part) forward.

As illustrated in FIGS. 1 and 2, in the manipulating device 100 according to Embodiment 1, the operator is able to grip the grip part 50, while he/she places the elbow on the armrest member 104. Thus, the operator's burden is reduced, as compared with the conventional manipulating device.

Moreover, as illustrated in FIG. 2, in the manipulating device 100 according to Embodiment 1, a shoulder joint of the operator (glenohumeral joint) is substantially in agreement with the output shaft of the drive motor 61 provided to the first connecting member 11, when seen vertically. Thus, as illustrated in FIG. 3, when the operator pivots the manipulating member 105 (grip part 50) to the left and right centering on the shoulder joint, the first parallel linkage mechanism 101 and the second parallel linkage mechanism 102 can operate following the motion of the operator. Therefore, the burden or load on the operator's hand (wrist or elbow) and/or shoulder is reduced.

Meanwhile, since the operational range of the manipulator is limited when using the manipulator placed on a desk etc. like the parallel manipulator disclosed in Patent Document 1, the operator needs to operate within the operational range of the manipulator. Therefore, the operator tends to put an unnecessary force in his/her hand (wrist, elbow) and/or shoulder, and the operator may easily get tired.

However, in the manipulating device 100 according to Embodiment 1, the third link 3A is supported by the support member 103. In detail, the third link 3A is supported in the state where it is suspended by the support member 103. Thus, as illustrated in FIG. 1, the center of the shoulder joint can be substantially in agreement with the center of the shaft member 21 of the second parallel linkage mechanism 102.

For this reason, as illustrated in FIG. 9, when the operator pivots the manipulating member 105 (grip part 50) upwardly, while using the elbow joint as a fulcrum, the manipulating device 100 can operate the first parallel linkage mechanism 101 and the second parallel linkage mechanism 102 so as to follow the motion of the operator.

Moreover, as illustrated in FIG. 10, even when the operator carries out an operation to project the manipulating member 105 (grip part 50) forward, while using the shoulder joint as a fulcrum, the manipulating device 100 can operate the first parallel linkage mechanism 101 and the second parallel linkage mechanism 102 so as to follow the motion of the operator.

Therefore, in the manipulating device 100 according to Embodiment 1, the operator's burden is further reduced, as compared with the conventional manipulating device.

Moreover, in the manipulating device 100 according to Embodiment 1, the position sensors 72 and 73 are disposed outward of the manipulating device 100. Therefore, it can be prevented that the operator's shoulder contacts the position sensors 72 and 73. Therefore, the burden or load on the operator's hand (wrist or elbow) and/or shoulder is reduced.

Moreover, in the manipulating device 100 according to Embodiment 1, the counter weight 20 is provided at the tip end of the fourth link 4B. Therefore, it can be prevented that the manipulating member 105 (grip part 50) is depressed below the original point.

Moreover, in the manipulating device 100 according to Embodiment 1, the drive motor 64 and the drive motor 65 are disposed in the rear-end part of the second link 2B. Thus, the drive motors 64 and 65 function as the counter weights against the manipulating member 105. Therefore, the weight of the counter weight 20 can be reduced.

Further, in the manipulating device 100 according to Embodiment 1, the first movable part 51 is disposed rearward of the grip part 50. Thus, the yaw axis of the operator's wrist can be substantially in agreement with the shaft member 31 of the first movable part 51. Therefore, it can be prevented that the operator may put the unnecessary force in his/her wrist, and therefore, the burden or load on the operator's wrist can be reduced.

Note that, in the manipulating device 100 according to Embodiment 1, although the drivers 61-66 are provided, it is not limited to this configuration. One or more drivers among the drivers 61-66 may not be provided.

It is apparent for a person skilled in the art that many improvements or other embodiments of the present disclosure are possible from the above description. Therefore, the above description is to be interpreted only as illustration, and it is provided in order to teach a person skilled in the art the best mode that implements the present disclosure. The details of the structures and/or the functions may be changed substantially, without departing from the spirit of the present disclosure.

INDUSTRIAL APPLICABILITY

Since the manipulating device of the present disclosure can reduce the burden or load on the operator's hand and/or shoulder as compared with the conventional manipulating device, it is useful in the field of robots.

DESCRIPTION OF REFERENCE CHARACTERS

1A First Link
1B First Link
2A Second Link
2B Second Link
3A Third Link
3B Third Link
4A Fourth Link
4B Fourth Link
11 First Connecting Member
12 Second Connecting Member
13 Reduction Gear
20 Counter Weight
21 Shaft Member
22 Shaft Member
23 Shaft Member
24 Shaft Member
25 Shaft Member
26 Shaft Member
30 Connecting Member
31 Shaft Member
32 Pulley
33 Belt
34A Disk Member
34B Disk Member
35A First Link Part
35B First Link Part
36A Groove
36B Groove
37A Guide Part
37B Guide Part
41A Shaft Member
41B Shaft Member
42A Second Link Member
42B Second Link Member
43A Fixed Part
43B Fixed Part
44A Wire
44B Wire
50 Grip Part
51 First Movable Part
52 Second Movable Part
53 Third Movable Part
61 Drive Motor
62 Drive Motor
63 Drive Motor
64 Drive Motor
65 Drive Motor
66 Drive Motor
71 Position Sensor
72 Position Sensor
73 Position Sensor
74 Position Sensor
75 Position Sensor
76 Position Sensor
81 Body Part
82 Supporting Part
83 Pulley
84 Pulley
85 Belt
86 Shaft Member
87 Fastening Member
100 Manipulating Device 101 First Parallel Linkage Mechanism
102 Second Parallel Linkage Mechanism
103 Support Member
103A Reinforcement Member
104 Armrest Member
105 Manipulating Member
106 Carriage
107 Wheel
110 Controller
200 Robot
201 Driver
202 Force Sensor
300 Robot System

The invention claimed is:

1. A manipulating device comprising:
    a first parallel linkage mechanism having a pair of first links and a pair of second links;
    a second parallel linkage mechanism having a pair of third links and a pair of fourth links; and
    a support member supporting a first link of the third links,
    an armrest member, to which a manipulating member is attached at a tip-end part thereof, the armrest member disposed on a lower-end part of the first parallel linkage mechanism, wherein
    a first link of the second links is attached to an upper-end of the first links,
    a first link of the fourth links is attached to a lower-end of the third links,
    the first link of the second links and the first link of the fourth links are the same link such that the first parallel linkage mechanism and the second parallel linkage mechanism commonly use the first link of the second links and the first link of the fourth links.

2. The manipulating device of claim 1, further comprising:
    position sensors configured to detect positions of a base-end part of a first link of the first links and a base-end part of a second link of the second links; and
    a controller configured to control a position and/or a posture of a robot based on the positions detected by the position sensors.

3. The manipulating device of claim 2, wherein the position sensors are disposed outward of the manipulating device.

4. The manipulating device of claim 1, wherein the second parallel linkage mechanism is rotatably supported about a yaw axis.

5. The manipulating device of claim 1, wherein the manipulating member has
    a grip part,
    a first movable part configured to rotate the grip part about a yaw axis,
    a second movable part configured to rotate the grip part about a pitch axis, and
    a third movable part configured to rotate the grip part about a roll axis, wherein
        the first movable part is disposed rearward of the grip part.

6. The manipulating device of claim 1, further comprising a control device that executes a bilateral control, wherein a drive motor is disposed in each of a base-end part of a first link of the first links and a base-end part of a second link of the second links.

* * * * *